May 3, 1932. W. E. BANKS ET AL 1,856,455
CONNECTER
Filed June 21, 1928 2 Sheets-Sheet 2
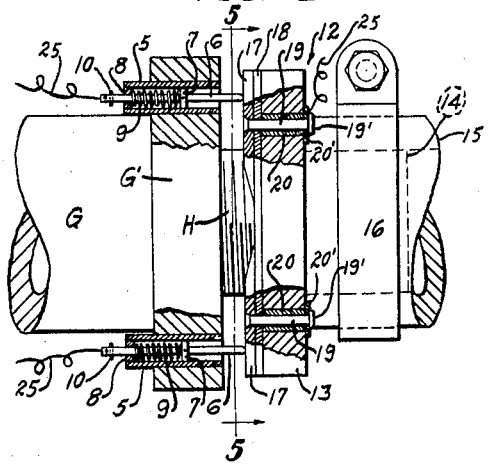
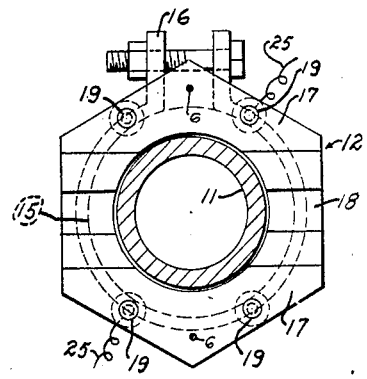
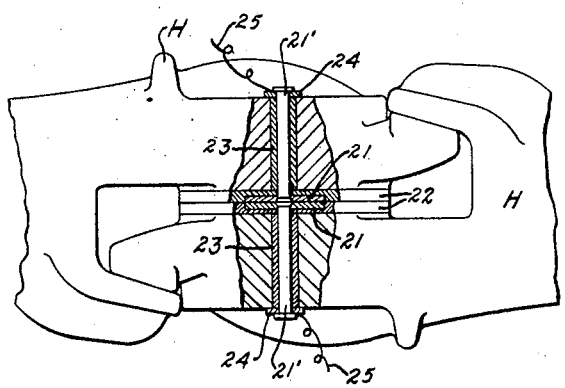
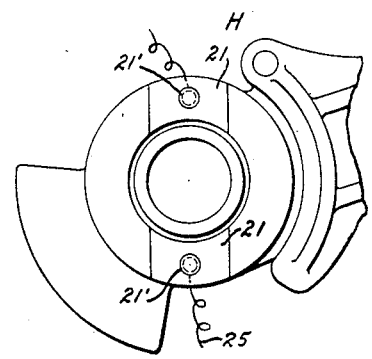
INVENTOR
A. F. STONE
W. E. BANKS
BY
ATTORNEY Patented May 3, 1932

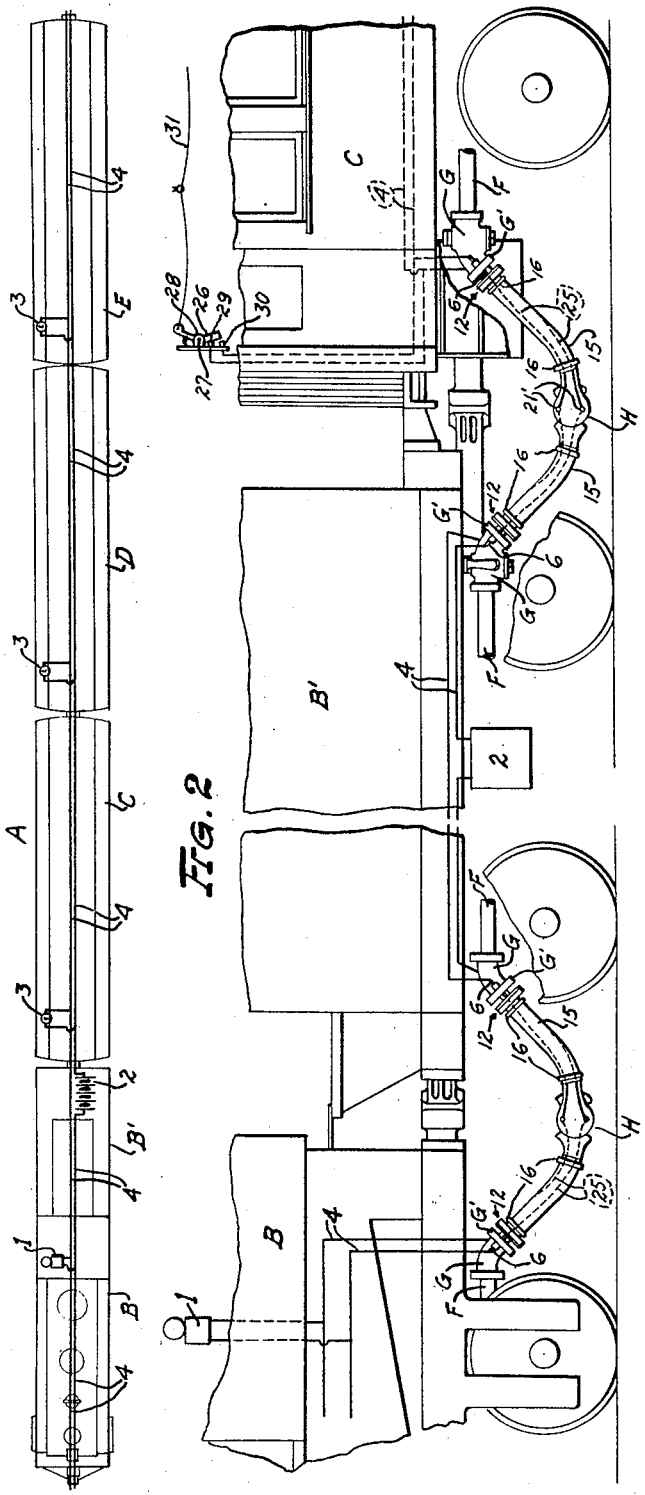

1,856,455

UNITED STATES PATENT OFFICE

WILLIAM E. BANKS AND ALBERT F. STONE, OF ST. LOUIS, MISSOURI

CONNECTER

Application filed June 21, 1928. Serial No. 287,227.

This invention relates generally to connecters and particularly to an improved connecter for railroad trains, the predominant object of the invention being to provide a railroad train comprising a locomotive and a plurailty of coaches with means whereby signals may be transmitted electrically from any one of the coaches to the cab of the locomotive where the operator of the train, or engineer, as he is called, is stationed.

In the operation of a railroad train, members of the crew in charge thereof who are stationed in the coaches of the train are frequently called on to give signals to the engineer of the train at his position in the cab of the locomotive. Most modern trains are equipped with air brakes and hence the locomotives and coaches are provided with pipes forming parts of the air brake system, compressed air being conducted through said pipes to the brakes at the wheels of the locomotives and coaches. Because of the presence of compressed air on the trains most trains prior to our invention were equipped with signaling systems for signaling the engineers which were operated by compressed air, each of such systems usually comprising a compressed air whistle located in the cab of the locomotive and cords passing through the various coaches by means of which the compressed air whistle might be operated from the coaches. In the operation of trains equipped with the compressed air signaling systems referred to false signals, caused by leaks in the compressed air systems, were frequently given to the engineers whereby said compressed air signaling systems were rendered less dependable than desired.

In view of the foregoing, we have devised the signaling system disclosed herein which, briefly stated, comprises an electrically actuated signaling device which is located in the cab of the locomotive, and means arranged in the various coaches of the train for operating said electrically actuated signaling device. In accordance with our invention each of the coaches, the locomotive and the tender of a train is provided with electrical conductors whereby the electrical energy which operates the signaling device in the cab of the locomotive may be conducted through the coaches and tender and into the cab of the locomotive. Our invention includes means whereby the electrical conductors associated with the various coaches, the locomotive and the tender of a train may be conveniently connected and disconnected when the various coaches, the locomotive and the tender are being coupled or uncoupled.

In the drawings—

Fig. 1 is a diagrammatical view showing a train in plan equipped with our improved signaling system.

Fig. 2 is a fragmentary side elevation of a locomotive, a tender and a coach equipped with our improved signaling system.

Fig. 3 is a fragmentary plan view of cooperating parts of the compressed air systems of a pair of adjacent coaches (not shown) showing the manner in which the electrical conductors of said coaches are connected when the compressed air systems of said coaches are coupled together.

Fig. 4 is an enlarged view, partly in side elevation and partly in section, showing a pair of cooperating members of the air system of a locomotive or a coach and illustrating the manner in which the cooperating electric contact members are associated therewith.

Fig. 5 is a section on the line 5—5 of Fig. 4.

Fig. 6 illustrates a pair of cooperating compressed air hose couplers showing the electric contact members associated therewith.

Fig. 7 shows one of the coupling members illustrated in Fig. 6.

In Fig. 1 of the drawings, which illustrates one embodiment only of our invention, A designates a railroad train which comprises a locomotive B, a tender B', and a plurality of coaches C, D, and E. The locomotive B is provided with the usual cab from which the operation of the train is controlled by the engineer in charge thereof. In accordance with our invention, a suitable electrically operated signaling device 1, which gives either an audible or visual signal, is located in said locomotive cab. Located preferably in the tender B' of the train although it may be located elsewhere on the train, is a battery or other suitable source of electrical energy 2. In each of the coaches of the train is arranged a push button or other suitable device 3 for operating the signaling device 1. The signaling device 1, the battery 2 and the push buttons 3 on a complete train are connected electrically by electrical conductors 4, which are located on the locomotive, the tender, and the coaches, the electrical conductors of the locomotive, the tender, and the various coaches being connected together electrically in a manner to be hereinafter described, to provide a complete electrical system which extends through the entire train.

As previously stated, the locomotive, tender and coaches of a railroad train equipped with compressed air brakes each is provided with pipes through which compressed air is conducted and, when a locomotive, tender and a plurality of coaches are coupled together to produce a train, the compressed air pipes on the various vehicles of the train likewise are coupled together to provide a complete compressed air system extended throughout the train. For the purpose of connecting the compressed air pipes on the various vehicles making up the train when a train is being made up, each of the coaches and the tender is provided with compressed air hoses at its opposite ends, and the locomotive is provided with a compressed air hose at its rear end, said air hoses being attached to the compressed air pipes on the vehicles mentioned, and said hoses being provided with coupling elements at their outer ends. The coupling elements at the ends of the compressed air hoses on the locomotive, tender and coaches are constructed to provide convenient means of coupling the air systems on the various vehicles of a train, the coupling elements on air hoses of adjacent vehicles being capable of rapid coupling by a single operation.

To provide for the rapid and convenient attachment of the electrical conductors on the various vehicles of the train to complete the electrical signaling system of said train, we utilize the coupling elements at the ends of the compressed air hoses associated with the various vehicular elements of the train as the coupling elements of the electrical conductors on said various vehicular elements. In other words, the coupling elements at the ends of the compressed air hoses at the opposite ends of each of the coaches and of the locomotive and tender are provided with electrical contact members which are electrically connected to the conductors associated with the coaches, the locomotive and tender.

When a pair of compressed air coupling elements of a pair of adjacent vehicles are coupled, the electrical contact members associated therewith are brought into electrical connection with each other, whereby the coupling of said coupling elements in addition to connecting the air systems on the adjacent vehicles likewise connects the electrical conductors of the electrical signaling systems on said adjacent vehicles.

By referring particularly to Fig. 2 of the drawings, it will be noted that the locomotive B, the tender B' and the coach C are provided each with a compressed air pipe F which is supported thereon in the usual manner (not shown). It will be noted also that an elbow G is secured to the compressed air pipe F associated with said locomotive at the end of said compressed air pipe which is located at the rear of the locomotive, said elbow G being provided with flanges at its opposite ends. Extended into apertures formed through the flange G' of the elbow G is a pair of sleeves 5, said sleeves 5 being preferably located at opposite sides of said elbow as shown in Figs. 3 and 4, and said sleeves being formed of insulating material. Arranged within each of the sleeves 5 is a plunger 6 on which a collar 7 is fixed, said collar being approximately the same diameter as the interior of the associated sleeve. Each sleeve 5 at its rear end is closed by a wall 8 in which an aperture is formed, through which the plunger 6 extends. An expansible coil spring 7 is interposed between the rear wall 8 of a sleeve 5 and the collar 7 fixed on the plunger 6 mounted in said sleeve. In view of this arrangement it is obvious that the coil spring 7 will tend to force the plunger in a direction toward the open ends of the sleeves 5, said plungers being provided with pins 10 contacting with the rear walls of the sleeves, thus limiting forward movement of said plungers.

Screwed into that end of the elbow G at which the flange G' is located is a screw threaded nipple 11, the opposite end of said nipple being screwed into a member 12 comprising a flange portion 13 and a sleeve portion 14, said sleeve portion being extended into a hose 15 and secured to said member 12 by means of a hose clamp 16. The flange portion 13 of the member 12 at the face thereof adjacent to the flange G' of the elbow G is provided with a pair of metallic contact plates 17, said contact plates being electrically insulated from said flange portion 13 by layers of suitable insulating material 18 which are interposed between the contact plates and the adjacent face of the flange portion 13 of the member 12. The contact plates 17 are fixed to the flange portion 13 by means of rivets 19 which pass through said contact plates, said layers of insulating material and said flange portion, as shown in Fig. 4. The rivets 19 extend through tubular members 20 formed of insulating material, whereby the rivets 19 are insulated from said flange portion 13. The rivets 19 at the ends thereof remote from the contact plates are provided with enlarged heads 19′, and these enlarged heads are electrically insulated from the adjacent face of the flange portion 13 by members 20′.

Attached to the hose 15, at the end remote from the end at which the member 12 is located, is a coupling element H of the type ordinarily employed to couple compressed air hoses of adjacent vehicular elements of trains. The coupling element H is provided with a pair of electrical contact plates 21, such as shown in Fig. 7, which plates 21 are arranged in recesses formed in a gasket 22 located at the face of the coupling element which contacts with a cooperating coupling element when a pair of air hoses are connected together; said plates being secured in place by rivets 21′ extending through said coupling element. The rivets are insulated from the coupling elements by tubular members 23 formed of insulating material, through which said rivets extend, and the enlarged head portions of said rivets are likewise insulated from the coupling element by insulating washers 24 (Fig. 6).

The electrical conductors 4 of the locomotive B are connected to the plungers 6 associated with the elbow G. Electrical conductors 25 electrically connect the rivets 19 with the rivets 21′, said electrical conductors 25 extend longitudinally of the air hose 15 and are preferably embedded in the rubber forming the wall of said hose.

When the air hose 15 is being attached to the compressed air pipe F of the locomotive, the member 12 which is internally screw threaded is screwed inwardly on the nipple 11 associated with said compressed air pipe until the contact plates 17 associated with said member 13 contact with the forward ends of the plungers 6. The plungers 6 are yieldably mounted, hence the member 12 may be screwed inwardly with respect to the nipple after contact between the plates 17 and the plungers has been made. When contact has been made between the plungers and the contact plates 17, as described, the contact plates 21 associated with the coupling element H, are placed in electrical contact with the conductors 4 on the locomotive through the instrumentality of the plungers 6, contact plates 17, rivets 19, conductors 25, and rivets 21′, which last mentioned rivets are in electrical contact with said contact plates 21.

The compressed air pipe of the tender B′ is provided, at the end thereof located adjacent to the locomotive, with one of the elbows G, and the same elements which have just been described as being associated with the elbow G on the locomotive are associated with the elbow G on the tender. That is to say, a nipple 11 is screwed into the elbow G on the tender and a compressed air hose 15 provided with a member 12 at one of its ends and a coupling element H at its opposite end is attached to said nipple. In like manner, at the opposite end of the tender B′ the compressed air pipe associated with said tender has a compressed air hose 15 attached thereto and the compressed air pipe on the coach adjacent to said tender is likewise provided with a compressed air hose 15. The parts which have been described as being associated with the air hose attached to the locomotive are also associated with the air hoses on the coach C and at the end of the tender adjacent to said coach. In other words, the cooperating air hoses on the tender B′ and coach C have associated therewith plungers 6 and conductors 25, which conduct electrical energy from said plungers to contact plates, such as those designated by the reference character 21, associated with the coupling elements H. The electrical conductors 4 of the tender and the coach also are connected to the plungers just referred to.

In view of the arrangement just described, it is obvious that when a locomotive, a tender and a plurality of coaches are coupled together to produce a train and the compressed air hoses of the various vehicles making up said train are coupled together to connect the air systems of said vehicles, the electrical conductors of the electrical signaling system of the various vehicles of which the train is composed are at the same time connected together in view of the fact that when a pair of the coupling elements H, at the ends of the cooperating air hoses 15 are coupled together, the contact plates 21 associated with said plates will be brought into firm contact with each other, whereby electrical energy will pass from one of said contact plates to the other. It is plain, therefore, when all of the hoses of the various vehicles of the train are coupled together, the electric wiring of the signaling system will be complete throughout the train and hence a signal may be given to the engineer in the cab of the locomotive from any of the coaches of the train.

If it is preferable in the use of our invention to retain the signal cords for transmitting signals from the coaches of a train to the engineer, this may be accomplished by employing a lever 26 (Fig. 2) which is pivoted at 27 to a suitable support 28 fixed to the wall of the coach. 29 and 30 indicate contact members to which wires of the signal circuit are connected, and 31 designates the signal cord which is attached to the upper end of the lever 26. In accordance with this arrangement a signal will be given by pulling the cord 31, whereby the lever 26 will be moved into contact with the two contact members 29 and 30 and the current will pass from one of said contact members to the other thereof, along the portion of the lever extended between said contact members.

We claim:—

1. In combination with a railroad vehicle having a compressed air pipe mounted thereon, an air hose having a coupling element attached to an end thereof, a member at the opposite end of said air hose, means for attaching said air hose to said compressed air pipe, an electrical contact plate fixed to said member, an electrical contact member associated with said compressed air pipe, and electrical conductors connected to said contact plate and said contact member, said contact plate being arranged to contact with said contact member when said hose is attached to said compressed air pipe, whereby electrical current will pass from the electrical conductors associated with one of said contact elements to the electrical conductors associated with the other of said contact elements.

2. In combination with a railroad vehicle having a compressed air pipe mounted thereon, an air hose having a coupling element attached to an end thereof, a member at the opposite end of said air hose, means comprising a screw threaded nipple attached to said compressed air pipe and on which said member is screwed for attaching said air hose to said compressed air pipe, an electrical contact plate fixed to said member, an electrical contact member associated with said compressed air pipe, and electrical conductors connected to said contact plate and said contact member, said contact plate being arranged to contact with said contact member when said hose is attached to said compressed air pipe, whereby electrical current will pass from the electrical conductors associated with one of said contact elements to the electrical conductors associated with the other of said contact elements.

3. In combination with a railroad vehicle having a compressed air pipe mounted thereon, an air hose having a coupling element attached to an end thereof, a member at the opposite end of said air hose, means for attaching said air hose to said compressed air pipe, an electrical contact plate fixed to said member, an electrical contact member associated with said compressed air pipe, and yieldably mounted with respect thereto, and electrical conductors connected to said contact plate and said contact member, said contact plate being arranged to contact with said contact member when said hose is attached to said compressed air pipe, whereby electrical current will pass from the electrical conductors associated with one of said contact elements to the electrical conductors associated with the other of said contact elements.

4. In combination with a railroad vehicle having a compressed air pipe mounted thereon, an air hose having a coupling element attached to an end thereof, a member at the opposite end of said air hose, means for attaching said air hose to said compressed air pipe, an electrical contact plate fixed to said member, an electrical contact member associated with said compressed air pipe, an electrical conductor connected to said contact member, a contact plate associated with said coupling element at an end of said air hose, and an electrical conductor connecting the contact plate associated with said member with the contact plate associated with said coupling element, said contact plate associated with said member being arranged to contact with said contact member when said hose is attached to said compressed air pipe whereby said contact member and the contact plate associated with said coupling element will be electrically connected together.

In testimony that we claim the foregoing we hereunto affix our signatures.

WILLIAM E. BANKS.
ALBERT F. STONE.